H. HEWITT.

Rotary Harrow.

No. { 46, / 1,151. }

Reissued Mar. 19, 1861.

Witnesses:
R. S. Spencer
H. V. Coombs

Inventor:
Henry Hewitt.

N. PETERS, PHOTO-LITHOGRAPHER, WASHINGTON, D. C.

UNITED STATES PATENT OFFICE.

HENRY HEWITT, OF SAN FRANCISCO, CALIFORNIA, ASSIGNOR TO W. A. SANFORD.

IMPROVEMENT IN SEEDING-HARROWS.

Specification forming part of Letters Patent No. 27,668, dated March 27, 1860; Reissue No. 1,151, dated March 19, 1861.

*To all whom it may concern:*

Be it known that I, HENRY HEWITT, of San Francisco and State of California, have invented a new and Improved Vertically-Rotating Harrow; and I do hereby declare that the following is a full, clear, and exact description of the same, reference being had to the annexed drawings, making a part of this specification, in which—

Figure 1:
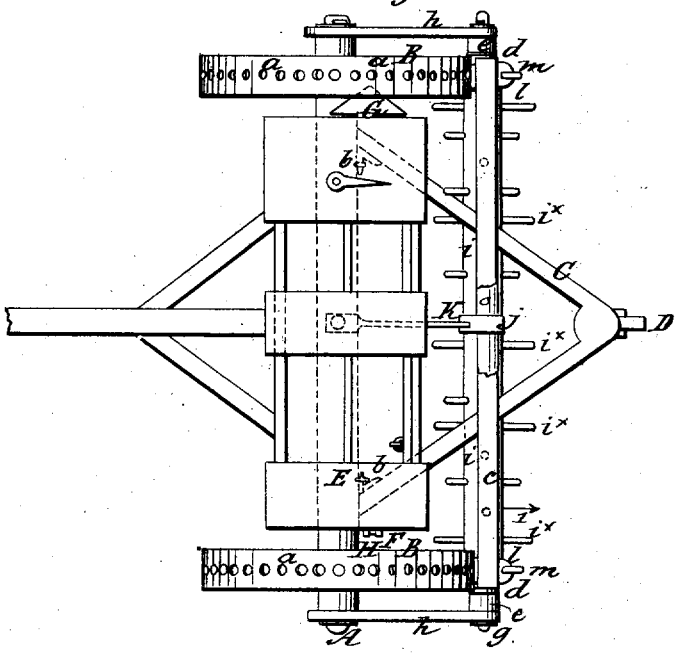
Figure 2:
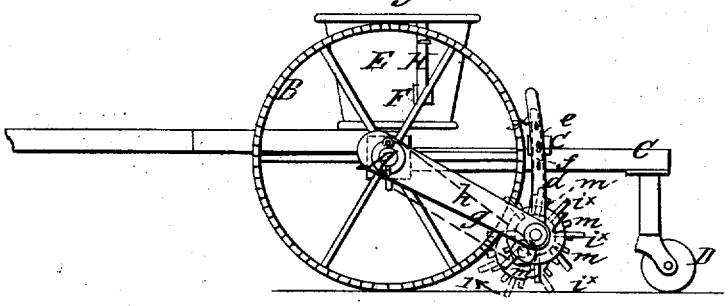

Figure 1 is a plan or top view of my invention, and Fig. 2 is a side view or elevation of the same, and similar letters of reference indicate corresponding parts in the two figures.

The nature of my invention is the arrangement hereinafter described.

To enable those skilled in the art to fully understand and construct my invention, I will proceed to describe it.

A is the axle; B B, the wheels, the peripheries of which are perforated with holes *a* at equal distances, as shown in Fig. 1. To the back side of the axle a triangular frame, C, is attached by joints *b b*, as shown by the dotted lines. The outer end is supported by a caster-wheel, D, and on the frame a cross-bar, *c*, is secured, extending outward from the frame at each side as far as the outer edges of the wheels B B, and pendants *d d* are attached to the ends of the bar *c* by hooks *e*, which pass through either of a series of holes in the pendants. Through the lower parts of the pendants a shaft, *g*, passes loosely, the ends of said shaft also passing loosely through the outer parts of radius-bars *h h*, the front parts of which are fitted loosely on the ends of the axle A. On the shaft *g* two cylinders, *i i*, are placed loosely, so that they may rotate freely thereon. These cylinders are of equal length, and their inner ends are fitted in a bearing, *j*, which is attached to the outer end of an arm, *k*, the inner end of which is connected loosely or by a joint to the axle A. Each cylinder *i* is provided with teeth $i^{\times}$, of suitable length. At the outer end of each cylinder *i* there is a hub, *l*, and these hubs have teeth or pins *m* at their peripheries, which teeth or pins work into the perforations *a* of the wheels B B, and by means thereof the harrow is operated in a direction opposite to the advance of the machine, penetrating and pulverizing the earth in a very efficient manner. The harrow is either entirely elevated and held suspended from the ground for moving from place to place or depressed for operation at any desired depth by means of the hooks and the holes in the pendants. The arm *k* of bearing *j* is made with a slide-joint, so that it may be adjusted to correspond with the bars *h*.

Any suitable seed-sower or implement for this purpose may be arranged on the axle A, and driven from one or both of the wheels B. In the drawings a seed-box, E, is shown placed on the axle, provided with a seed-slide provided at one end with a V-shaped projection, G, against which the spokes of the wheel B act, a spring, H, bearing against the opposite end of the slide, and a reciprocating movement is thus produced. A perforated plate is fitted in the bottom of the seed-box, and an adjustable perforated slide is placed over said plate to regulate the discharge of the seed. A drill in any proper form may also be arranged in rear of said harrow, instead of a broadcast-sower.

Having thus fully described my invention and its mode of operation, what I claim as my invention, and desire to secure by Letters Patent, is—

The arrangement of the sowing apparatus and the cylindrical harrow, herein described, all the various parts being constructed for operation conjointly in the manner and for the purposes described.

HENRY HEWITT.

Witnesses:
W. S. SHAW,
GEO. H. HUGHSON.